United States Patent Office

Re. 25,645
Reissued Sept. 22, 1964

25,645

CRYSTALLINE N-ALKYL ACRYLAMIDE AND METHACRYLAMIDE POLYMERS

Donald J. Shields and Harry W. Coover, both of Kingsport, Tenn., assignors to Eastman Kodak Company, Rochester, N.Y., a corporation of New Jersey No Drawing. Original No. 3,075,956, dated Jan. 29, 1963, Ser. No. 756,279, Aug. 21, 1958. Application for reissue Apr. 13, 1964, Ser. No. 367,913
12 Claims. (Cl. 260—88.1)

Matter enclosed in heavy brackets [ ] appears in the original patent but forms no part of this reissue specification; matter printed in italics indicates the additions made by reissue.

This invention relates to the preparation of crystallizable acrylamide and methacrylamide polymers.

Substituted and unsubstituted acrylamides and methacrylamides are attractive materials for the preparation of resinous polymers because of being readily available, inexpensive and easily polymerizable to form polymers which can be molded, spun into strong and dyeable fibers, extruded into fibers and sheets and coated from their solutions, etc. Yet, in spite of their many excellent and unusual properties, polyacrylamides have not been widely used primarily because of their solubility in and sensitivity to water. It is quite apparent that a water-soluble polymer, although valuable in certain uses, is seriously limited in its applications and totally unsatisfactory for many uses. For example, there are small-scale uses for water-soluble fibers in the preparation of fine or novelty-weave fabrics where the water-soluble fiber is used to impart strength to the fabric during the weaving operation and is then dissolved away. But, in general, a water-soluble fiber is useless as a general purpose fiber.

We have now discovered that highly crystalline, water-insoluble, high-molecular weight acrylamide polymers can be prepared from monomers that heretofore have been known to give only water-soluble polymers by using certain compounds in combination as polymerization catalysts. The polymer products prepared according to our invention show decreased water sensitivity, greater hardness, higher density and improved heat resistance as compared to corresponding polyacrylamides prepared with conventional catalysts. The crystalline products can be readily transformed by molding, extrusion or some other suitable method into ribbons, bands fibers, sheets or solid articles of improved toughness, hardness and heat resistance as compared with the corresponding amorphous polymers produced heretofore. The sheet materials of the invention are useful as photographic film supports. If desired, the products can be modified by incorporation therein of fillers, dyes, pigments, etc.

It is accordingly, an object of the invention to provide novel water-insoluble, high-molecular weight, highly crystalline acrylamide polymers. Another object is to provide useful general purpose fibers thereof. Another object is to provide a process for preparing the said crystalline polymers. Other obpects will become apparent hereinafter.

In accordance with the invention, we prepare water-insoluble, high-molecular weight, crystalline acrylamide and methacrylamide polymers by contacting a monomeric compound represented by the following general formula:

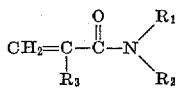

wherein $R_1$ and $R_2$ each represents a hydrogen atom or an alkyl group of from 1–4 carbon atoms and $R_3$ represents a hydrogen atom or a methyl group, alone or together with up to about 30%, based on the total weight of the monomers, of a different acrylamide or methacrylamide, styrene, an alkyl ester of acrylic or methacrylic acid wherein the alkyl group contains from 1–4 carbon atoms e.g. methyl acrylate, methyl methacrylate, etc., in the presence of a catalyst comprising a metal alkyl or aryl or a mixture of a metal alkyl or aryl and a transition element derivative at, −70°–200° C., but preferably from −70°–120° C., until the monomer has polymerized to give the highly crystalline polymer thereof. Ordinarily, a hydrocarbon reaction medium is employed, e.g. pentane, hexane, heptane or higher alkanes, toluene, and the like, although in some cases superior results are obtained by using coordinating solvents such as dioxane, tetrahydrofuran, dimethoxyethane, and the like, either alone or in admixture with one of the preceding hydrocarbon solvents. The polymer products are separated from the reaction mixture by conventional methods, e.g. by evaporation of the solvent medium, by precipitation into a nonsolvent, washing, drying, etc. While the reaction can be carried out at any desired pressure, the preferred method is to employ higher pressures, for example, in a closed vessel such as an autoclave. The molecular weight of the polymer products can be varied but all are greater than 1,000 and preferably greater than 10,000.

Suitable catalysts comprise metal alkyls of the general formula $R_nM$, wherein n represents an integer of 1–3, R represents an alkyl group of from 1–6 carbon atoms, e.g. methyl, ethyl, propyl, isopropyl, butyl, hexyl, etc. or an aryl group of 6–7 carbon atoms e.g. phenyl, o-tolyl, etc. groups and M represents a metal atom of groups I, II and III of the periodic table of elements alone or in combination with one or more compounds of the metals represented by groups 4B, 5B, 6B and 8, as well as manganese group 7, of the periodic table of elements. When a catalyst combination is used, the preferred combinations are the trialkylaluminums and alkyl lithiums with the halides of titanium, ziconium, vanadium, chromium and molybedenum, and more especially triethylaluminum and titanium tetrachloride. The proportions of the catalyst components can be varied over a wide range, e.g. from 0.05–10.0% or more, based on the total weight of monomer to be polymerized, but preferably from 0.1 to 5.0% of the metal alkyl and from 0.1 to 5.0% of the said metal halides.

Suitable acrylamides and methacrylamides that can be polymerized according to the process of the invention to give highly crystalline polymers include acrylamide and its N-methyl, N-ethyl-N-propyl, N-isopropyl, N-butyl, N,N-dimethyl, N,N-diethyl, N,N-dipropyl, N,N-diisopropyl, N,N-dibutyl, etc. derivatives, and methacrylamide and its corresponding N-alkyl N,N-dialkyl substituted derivatives. Some of these materials such as N-t-butyl acrylamide give water-insoluble polymers under ordinary polymerizing conditions. In these few special cases, the crystalline polymers exhibit, in addition to excellent water resistance, the improved properties of higher hardness, heat distortion temperature, etc. over ordinary polymers (prepared with conventional catalysts). Our novel process gives particularly outstanding results in the case of mono-N-substituted acrylamides such as N - isopropyl acrylamide. For example, when this compound is polymerized employing ordinary free radical catalysts, the resulting polymer is water-soluble even though its molecular weight is high. In contrast thereto, when this compound is polymerized according to the process of our invention, the resulting polymer is water-insoluble even though the molecular weight is somewhat lower.

The following examples will serve to illustrate further the novel crystalline polymers of the invention and the manner of preparing the same.

EXAMPLE 1

Into a 150 ml. pressure bottle purged with $N_2$ were placed 80 ml. of dry heptane, 10 g. of recrystallized N-isopropylacrylamide, and 0.1 g. of acetyl peroxide. The mixture was tumbled at 45° C. for 15 hours. Evaporation of the moderately viscous reaction mixture gave a solid product that had an inherent viscosity of 1.0 and was completely soluble in water. Attempts to mold the product were unsuccessful due to its high sensitivity to water. X-ray diffraction patterns showed it to be completely amorphous.

EXAMPLE 2

Into a 150 ml. pressure bottle purged with $N_2$ were placed 80 ml. of dry heptane, 10 g. of recrystallized N-isopropylacrylamide, 0.4 g. of triethylaluminum, and 0.1 g. of titanium tetrachloride. The mixture was tumbled at 45° C. for 15 hours. A white, heptane-insoluble polymer was obtained. It was completely insoluble in hot and cold water, had an inherent viscosity of about 0.2, according to X-ray diffraction patterns was highly crystalline, and was molded to give a hard, rigid, water-resistant plastic. It was also melt-spun, drafted and stabilized to given an oriented, crystalline, water-insoluble fiber.

In place of the N-isopropyl acrylamide in above Example 2, there may be substituted an equivalent amount of any other of the mentioned acrylamides and methacrylamides to give corresponding highly crystalline, high-molecular weight polymers, for example, crystalline poly-N-isopropylmethacrylamide, crystalline poly-N-methylacrylamide, crystalline poly-N-methylmethacrylamide, crystalline polymethacrylamide, crystalline poly-N-butylacrylamide, etc. Also, when a catalyst combination is used, the triethylaluminum and titanium tetrachloride can be replaced with any other of the mentioned metal alkyls and metal halides, for example, a combination of triethylaluminum and zirconium tetrachloride, trimethylaluminum and titanium trichloride, lithium butyl and titanium trichloride, etc.

EXAMPLE 3

Into a 100 ml. pressure bottle purged with nitrogen were placed 10 ml. of dry heptane and 5 g. of N-isopropylacrylamide. 2.27 g. of a 6.15% solution of n-butyllithium in heptane was added, and then 0.16 g. of anhydrous $TiCl_3$. The mixture was agitated for one minute and was allowed to stand at atmospheric pressure at 25° C. A white, heptane-insoluble polymer was obtained. It was completely insoluble in hot and cold water, had an inherent viscosity of about 0.3 according to X-ray diffraction patterns was highly crystalline, and was molded to give a hard, rigid, water-resistant plastic. It was also melt spun, drafted, and stabilized to give an oriented, crystalline, water-insoluble fiber.

EXAMPLE 4

The procedure of Example 3 was followed using 0.64 g. of sodium naphthalene and 0.68 g. of anhydrous zirconium tetrachloride. A similar polymer having an inherent viscosity of 0.45 was obtained.

EXAMPLE 5

The procedure of Example 3 was following using 2.76 g. of 16.3% triethylaluminum solution in heptane and 0.62 g. of titanium trichloride. A similar polymer having an inherent viscosity of 0.27 was obtained.

EXAMPLE 6

Into a 100 ml., 3-necked flask equipped with dropping funnel, thermometer, and stirrer, and cooled in a Dry Ice bath was placed 40 g. of dry dimethoxyethane and 20 g. of N-isopropylacrylamide. 6.1 ml. of a 10.5% solution of n-butyllithium in hexane was added dropwise with stirring. An exothermic reaction resulted and the polymer partially separated from solution. The product was treated with methanol to remove catalyst residues, and 11 g. of a polymer having an inherent viscosity of 0.38 was obtained. It was completely insoluble in hot and cold water, and according to X-ray diffraction patterns was highly crystalline. It was melt spun, drafted, and stabilized to give an oriented, crystalline, water-insoluble fiber.

EXAMPLE 7

Into a 100 ml., 3-necked flask equipped with dropping funnel, thermometer, and stirrer, and cooled in Dry Ice was placed 40 g. of dry toluene and 20 g. of N-isopropylacrylamide. 6.1 ml. of a 10.5% solution of n-butyllithium in hexane was added dropwise with stirring. An exothermic reaction resulted and the reaction mixture became thick. The product was treated with methanol to remove catalyst residues, and 15 g. of polymer having an inherent viscosity of 0.63 was obtained. X-ray analysis indicated that it was crystalline. It was insoluble in hot and cold water and could be spun into water-insoluble fibers.

EXAMPLE 8

To a 100 ml., 3-necked flask equipped with dropping funnel, thermometer, and stirrer and cooled in a Dry Ice bath to −60° C. were added 40 g. of dry heptane and 10 g. of N-isopropylacrylamide. 6 ml. of a 10.5% solution of n-butyllithium in heptane was added dropwise with stirring. A solid white polymer formed in the flask. The polymer was washed with methanol to remove catalyst residues, and 8 g. of polymer having an inherent viscosity of 0.3 was obtained. It was insoluble in hot and cold water and according to X-ray diffraction analysis had a high degree of crystallinity. It could be spun into water-insoluble fibers.

EXAMPLE 9

Into a 100 ml. pressure vessel purged with nitrogen were placed 30.6 ml. of dry heptane, 6 ml. of 1,2-dimethoxyethane, 20 g. of N-isopropylacrylamide, 405 g. of 16.3% triethylaluminum in dry heptane, and 0.34 g. of vanadium trichloride. An exothermic reaction occurred, and the solution became somewhat viscous. After heating at 70° for 16 hours, the polymer was isolated by treatment with methanol and hydrogen chloride. The polymer had an inherent viscosity of 0.2 and was insoluble in hot and cold water. X-ray analysis indicated that it had a high degree of crystallinity. It was spun into crystalline, water-insoluble fibers.

If desired, one or more different monomers can be copolymerized with the N-isopropylacrylamide. The second monomer can be a different acrylamide or methacrylamide monomer or it can be any of several monoethylenically unsaturated monomers. For example, the N-isopropylacrylamide can be copolymerized with styrene to give a highly crystalline copolymer or it can be copolymerized with methyl methacrylate to give a copolymer of slightly reduced crystallinity. This behavior is illustrated in, but should not be limited by, the following example.

EXAMPLE 10

The procedure of Example 1 was followed using 8 g. of recrystallized N-isopropylacrylamide, 2 g. of stryrene, 0.5 g. of triethylaluminum, and 0.2 g. of titanium tetrachloride. The mixture was tumbled at 65° for 15 hours. A white, heptane-insoluble polymer was obtained. It was completely insoluble in hot and cold water, had an inherent viscosity of about 0.8, and according to X-ray diffraction patterns was highly crystalline. It could be molded to give hard, rigid, water-resistant plastics.

The improved properties of the polymers of the invention which, in addition to decrease water sensitivity, includes increased hardness, higher density, and improved heat resistance, are probably related to the crystallinity of the polymer. The preparation of crystalline or crystallizable polymers is well known in the case of hydrocarbon type monomers such as ethylene, propylene, styrene, and the like. However, the literature is replete with references stating that monomers containing functional groups such as an amide carbonyl poison the usual catalysts that lead to crystalline polymers. According to our new process, however, crystalline polyacrylamides can be formed with surprising ease and in good yields and under exceptionally mild reaction conditions.

The invention has been described in detail with particular references to preferred embodiments thereof, but it will be understood that variations and modifications can be effected within the spirit and scope of the invention as described hereinabove and as defined in the appended claims.

What we claim is:

1. A crystalline linear addition polymer of an acrylamide compound represented by the following general formula:

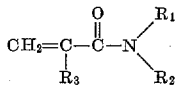

wherein $R_1$ and $R_2$ each represents *a member selected from the group consisting of a hydrogen atom and* an alkyl group of from 1 to 4 carbon atoms and $R_3$ represents a member selected from the group consisting of a hydrogen atom and a methyl group, said polymer having a crystalline X-ray diffraction pattern and a molecular weight greater than 1000 as determined from the intrinsic viscosity thereof.

2. A crystalline linear poly-N-isopropylacrylamide having a crystalline X-ray diffraction pattern and a molecular weight greater than 1000 as determined from the intrinsic viscosity thereof.

3. A crystalline linear poly-N-isopropylmethacrylamide having a crystalline X-ray diffraction pattern and a molecular weight greater than 1000 as determined from the intrinsic viscosity thereof.

4. A crystalline linear poly-N-methylacrylamide having a crystalline X-ray diffraction pattern and a molecular weight greater than 1000 as determined from the intrinsic viscosity thereof.

5. A crystalline linear poly-N-methyl methacrylamide having a crystalline X-ray diffraction pattern and a molecular weight greater than 1000 as determined from the intrinsic viscosity thereof.

6. A crystalline linear addition copolymer consisting of at least 70% by weight of N-isopropylacrylamide and not more than 30% by weight of styrene and having a crystalline X-ray diffraction pattern and a molecular weight greater than 1000 as determined from the intrinsic viscosity thereof.

7. A process for preparing a crystalline linear addition polymer having a crystalline X-ray diffraction pattern and a molecular weight greater than 1000 as determined from the intrinsic viscosity thereof which comprises contacting at −70° to 200° C. monomeric material selected from the group consisting of (a) a compound represented by the following general formula:

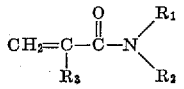

wherein $R_1$ and $R_2$ each represents *a member selected from the group consisting of a hydrogen atom and* an alkyl group of from 1 to 4 carbon atoms and $R_3$ represents a member selected from the group consisting of a hydrogen atom and a methyl group, and (b) a mixture consisting of at least 70% by weight of a compound represented by the said general formula and not more than 30% by weight of a different compound selected from the group consisting of a compound represented by the said general formula, styrene, an alkyl acrylate wherein the said alkyl group contains from 1 to 4 carbon atoms and an alkyl methacrylate wherein the said alkyl group contains from 1 to 4 carbon atoms, with a catalyst selected from the group consisting of (1) a metal alkyl represented by the general formula $$R_nM$$

wherein n represents an integer of from 1 to 3, R represents a member selected from the group consisting of an alkyl group containing from 1 to 6 carbon atoms, a phenyl group and a tolyl group and M represents a metal atom selected from Groups I, II and III of Mendeleeff's Periodic Table of elements and (2) a mixture of said metal alkyl (1) with a halide of a metal selected from the group consisting of groups 4B, 5B, 6B and 8 corresponding to the periodic table of elements on pages 448 and 449 of the Handbook of Chemistry and Physics, 40th edition, Chemical Rubber Publishing Company, and manganese.

8. The process of claim 7 wherein the said monomeric material is N-isopropylyacrylamide and the said catalyst is n-butyllithium.

9. The process of claim 7 wherein the said monomeric material is N-isopropylyacrylamide and the said catalyst is a mixture consisting of triethylaluminum and titanium tetrachloride.

10. The process of claim 7 wherein the said monomeric material is N-isopropylyacrylamide and the said catalyst is a mixture consisting of triethylaluminum and vanadium trichloride.

11. The process of claim 7 wherein the said monomeric material is N-isopropylacrylamide and the said catalyst is a mixture consisting of n-butyllithium and titanium trichloride.

12. The process of claim 7 wherein the said monomeric material is a mixture consisting of at least 70% by weight of N-isopropylacrylamide and not more than 30% by weight of styrene and the said catalyst is a mixture consisting of triethylaluminum and titanium tetrachloride.

References Cited in the file of this patent or the original patent

UNITED STATES PATENTS

| | | |
|---|---|---|
| 2,748,029 | Spear et al. | May 29, 1956 |
| 2,790,789 | Miller | Apr. 30, 1957 |
| 2,827,447 | Nowlin et al. | Mar. 18, 1958 |
| 2,842,474 | Pratt | July 8, 1958 |
| 2,932,633 | Juveland | Apr. 12, 1960 |

FOREIGN PATENTS

| | | |
|---|---|---|
| 538,782 | Belgium | Dec. 6, 1955 |

OTHER REFERENCES

Schildknecht: Vinyl and Related Polymers, Wiley and Sons (1952), pages 314–322.